J. R. HOLLEY.
PERCOLATOR.
APPLICATION FILED FEB. 1, 1908.
906,629.
Patented Dec. 15, 1908.
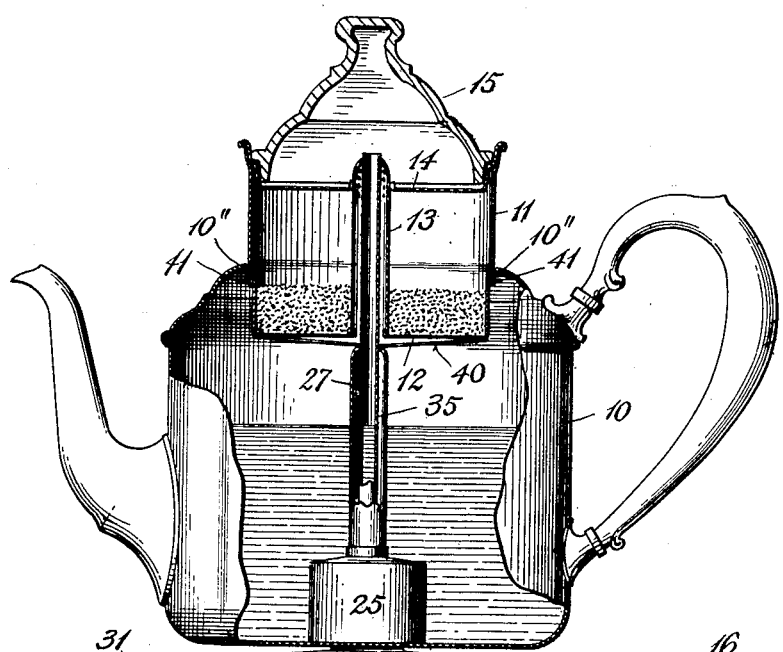
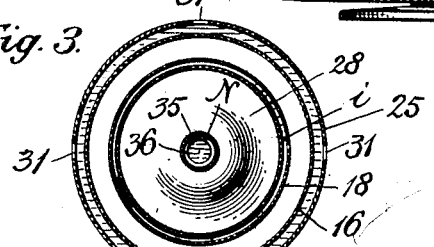
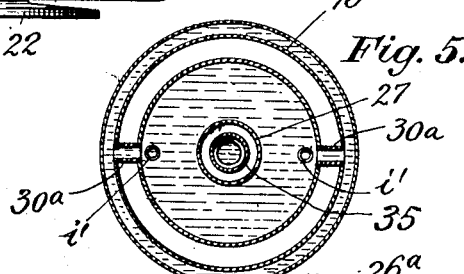
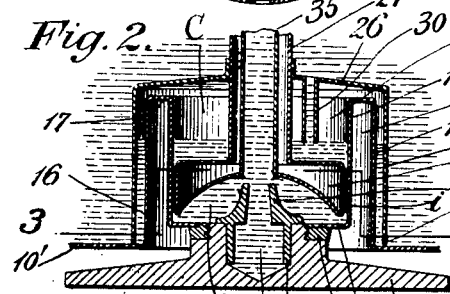
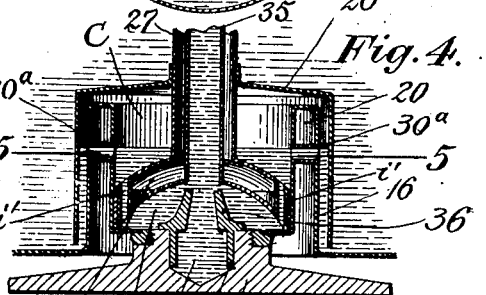
WITNESSES:
INVENTOR.
J. R. Holley,
BY
Chas. Francis Schmelz
ATTORNEY.

UNITED STATES PATENT OFFICE.

JULIAN R. HOLLEY, OF BRISTOL, CONNECTICUT, ASSIGNOR TO THE AMERICAN SILVER COMPANY, OF BRISTOL, CONNECTICUT, A CORPORATION OF CONNECTICUT.

PERCOLATOR.

No. 906,629.   Specification of Letters Patent.   Patented Dec. 15, 1908.

Application filed February 1, 1908. Serial No. 413,865.

*To all whom it may concern:*

Be it known that I, JULIAN R. HOLLEY, a citizen of the United States, and resident of Bristol, in the county of Hartford and State of Connecticut, have invented certain new and useful Improvements in Percolators, of which the following is a full, clear, and exact specification.

This invention relates to percolators or similar apparatus, and it has for one of its objects the provision of an improved device for bringing small quantities of liquids rapidly to a boiling point and to project the same above the level of the main body of the liquid in the vessel or pot.

My invention has furthermore for its object the provision of means for practically isolating the steam-generating device and the ejector-tube connected therewith from the liquid supply in the vessel, so that the heat necessary for the proper operation of such device may not be diffused or prematurely lost.

My invention has, also, for its object the provision of improved means for holding some of the several separable elements of the percolator in place on the vessel.

Further objects will be found in the general organization and construction of the device, as a whole, as will be hereinafter described, and the means for the attainment of which will be particularly pointed out in the claims.

Briefly stated, the present invention is especially applicable to the class of devices generally known as "coffee-percolators" in which a quantity of ground or powdered coffee is placed in a tray above the water in the pot, and small quantities of such water are heated and projected to a point above the coffee, so that this hot water will then be distributed over the same and gradually drip back into the main body of liquid in the receptacle.

In order to establish the process of ebullition, or what is usually understood as "pumping", it is of vital importance; firstly, to isolate the heating chamber or pump from the main body of the liquid in the receptacle, as far as it may be practicable; secondly, to concentrate the heat of the flame directly to the heating chamber; and thirdly, to organize the feed ducts through which fresh liquid is admitted into the heating chamber in such a manner that the liability of the heated liquid returning directly into the main body of the liquid in the receptacle will be reduced to a minimum and so that the steam pressure generated in the heating chamber may become fully effective in ejecting the water from the ejector tube and over the material in the tray. In other words, the construction of the heating chamber should be such that liquid from the main receptacle or reservoir may readily enter into the chamber, but at the same time be restricted from returning into the reservoir under sudden pressure-impulses generated in the chamber.

The present invention accomplishes the several desired results, and without requiring any check-valve or other device of that nature, as clearly illustrated in the accompanying drawings, in which similar characters denote similar parts, and in which—

Figure 1 is a general view of a percolator embodying my invention, Fig. 2 represents a central section of the "pump" of the device, Fig. 3 shows a horizontal section on line 3—3 of Fig. 2, Fig. 4 illustrates a modification of the pump shown in Fig. 2, and Fig. 5 is a section on line 5—5 of Fig. 4.

In the drawings, 10 denotes the liquid-receptacle which may be of any preferred form, and is adapted to receive at its top a holder or percolator 11 having a foraminous bottom or tray 12 on which the ground coffee is placed, and also provided with a centrally-disposed tube 13 the top of which has a series of apertures through which any overflow liquid in the holder 11 may return into the main reservoir 10. The upper portion of the percolator shell 11 is adapted to receive a perforated distributing plate 14, which, in turn, may be covered by a hood 15 to prevent the hot water, as it is projected upward by the pump in the reservoir, from spattering.

By referring to Fig. 2 it will be seen that the bottom 10′ of the receptacle 10 has an upturned annular flange 16 which supports, at its top, a cup comprising a top flange 17, an annular wall 18, and a bottom plate 19, thus leaving an annular air-space 20 between the flange 16 and wall 18. This cup constitutes the heat-receiving element of the device, and the heat from the flame or fire may be concentrated thereon by a ring 21 secured to the bottom plate 19 and preferably having a screw-thread connection with a base plate 22 which serves as a base for the entire receptacle to stand upon, and at the same time presents a considerable bulk of metal to absorb and conduct the heat from the flame to the bottom of the cup, while at the same time the lateral expanse of the base plate 22 is sufficient to guard the bottom of the reservoir against direct contact with the flame. In order to isolate this heating cup or chamber from the liquid in the receptacle 10, I provide a hood 25 the top plate 26 of which is connected in an air-tight manner to an air-tube 27 having at its lower end an air chamber 28, the bottom plate of which is preferably arched or in the shape of a hollow sphere to constitute, in conjunction with the cup-bottom 19, a primary heating chamber P into which liquid is admitted from the main reservoir, as follows: Leading from the hood-cover 26, and open at its ends, is a liquid-supply tube 30 which permits the liquid to descend from the reservoir into the isolated cup C and thence between the wall 18 thereof and the outside of the air chamber 28 into the bottom of said cup, until the liquid level in the cup is even with the bottom end of the tube 30 and seals the same, it being remembered of course that the air confined in the upper portion of the hood 26 will prevent any further rise of the liquid.

In order to balance the liquid columns in the cup C and the air space existing between the wall 16 and the inside of the hood, I deem it advantageous to provide small openings 31 near the lower edge of the hood 25, so that, furthermore, the latter may rest on the reservoir bottom 10' without interfering with the passage of the liquid.

The particular purpose of the primary heating chamber P is to expose a certain quantity of liquid to the heat preparatory to its entrance into a secondary heating or ebullition chamber S in which the water will be exposed to heat practically from all sides and consequently rapidly converted into steam.

Centrally-disposed relatively to the secondary heating chamber S, and tightly connected with the bottom plate of the air chamber 28, is a vertical tube 35, in which the liquid level is substantially on line with the level in the main reservoir 10 (see Fig. 1), this tube constituting what may be termed an "ejector" terminating with its lower end below the level of the lower end of the inlet tube 30, and through which the column of liquid contained therein will be precipitated upward by the sudden and violent generation of steam in the secondary heating chamber or well S. In order to minimize the loss of propelling energy of the steam I provide in the secondary heater a nozzle member N having a preferably tapered spout 36 the upper outlet of which is preferably slightly smaller than the inner diameter of the ejector tube 35; while the lower portion of said nozzle is bored somewhat larger than the size of the spout, thus forming a lower pocket in which the liquid is rapidly converted into steam the force of which will serve to condense and project the smaller quantity of liquid contained in the spout portion of the nozzle directly into the lower end of the ejector tube, therefore raising the liquid column therein until the force of the steam has spent itself, whereupon the nozzle pocket will again receive a fresh supply through the narrow space existing between the upper end of the spout and the lower end of the ejector tube.

Experience has demonstrated the fact that after the metal portions of the pump have once been heated sufficiently to generate steam in the well pocket S, this generation of steam takes place very rapidly, with the result that the successive ejecting impulses of the steam follow very closely upon each other, each impulse throwing out a quantity of liquid which at least equals that contained in the spout portion of the nozzle N.

It will be understood that the fact of the liquid being heated in the primary chamber before entering the secondary chamber, will naturally be conducive in lessening the time which would ordinarily be required if such liquid should enter the secondary chamber in a cold condition.

From the foregoing it will be seen that the steam generated in the secondary chamber has, *per se*, no possible exit other than through the spout, and, inasmuch as the liquid in the spout is rapidly thrown directly into the ejector tube, the liability of waste or diffusion of energy is naturally minimized, so that the "pump" will perform its function rapidly and with considerable volume.

While in the construction shown in Figs. 2 and 3, liquid is admitted into the primary chamber P in a very thin film as determined by the space $i$ existing between the outer surface of the air chamber 28 and the inner surface of the cup-wall 18, this space being sufficiently narrow to prevent escape of steam through the liquid film therein, I have shown in Figs. 4 and 5 a modification, in which the liquid passes from the main reservoir into the hood $26^a$, filling the space between the inner surface thereof and the outer surface of the flange 16, and traversing the air space 20 through one or more small conduit tubes $30^a$ so as to enter the pocket or cup C in which the air chamber $28^a$ fits and bottoms, the liquid passing through one or more vertically-disposed ducts $i'$ into the primary heating chamber P.

It is, of course, evident that by virtue of the air spaces and air chambers which are interposed between the heating chambers and the main liquid supply, the flame-power is concentrated, particularly upon the parts to be heated, and the radiation through the liquid and the consequent reduction of heat is consequently avoided, this feature also prevailing in regard to the ejector tube in which the liquid temperature will not be decreased on account of the air tube 27.

Means are provided for resisting any upward movement of the air-chamber 26 and ejector tube 35 during the pumping operation, these means consisting preferably of a resilient blade 40 having an aperture to permit the free passage of the ejector tube 35 but resting on top of the air tube 27 (see Fig. 1), both ends of said blade being in engagement with the bottom plate 12 of the percolator-cup 11, which may have two or more projections 41 adapted to pass below the rim 10'' of the reservoir 10, so that in this manner the cup 11 as well as the air chamber 28 with its tubes 27 and 35 will be held in position in the reservoir.

I claim:—

1. The combination, with a reservoir having at its bottom a cup separated from the liquid in the reservoir by an air space, of a hood covering said cup and coöperative therewith to form a sealed air chamber, a conduit projecting below the top-plate of said hood for permitting a flow of liquid from the reservoir into said cup, and adapted to be sealed by the rise of the liquid in said cup, and an ejector tube having an air tight connection with said hood and having its lower opening at a level below the lower end of said conduit, whereby the hood air-space will be maintained.

2. The combination, with a reservoir having at its bottom a cup separated from the liquid in the reservoir by an air space, of a hood covering said cup, a conduit for permitting the flow of liquid from the reservoir into said cup, and an ejector tube having an air tight connection with and entering said cup and terminating at its lower end at a level below said conduit whereby the air space between the liquid in the cup and that in the reservoir will be preserved.

3. The combination, with a reservoir having at its bottom a cup separated from the liquid in the reservoir by an air space, of a secondary chamber disposed below said cup but opening thereinto, a conduit for admitting liquid from the reservoir into the cup, and an ejector tube, having an air tight connection with and projecting into said cup and having its terminus below the level of said conduit, and adjacent the opening into said secondary chamber whereby the liquid in the secondary chamber, when heated, will be projected directly into said tube.

4. The combination, with a reservoir having at its bottom a cup separated from the liquid in the vessel by an air space, and means for permitting the passage of liquid from the reservoir into said cup, of an ejector tube projecting into said cup and having at its lower end an air chamber for limiting the quantity of liquid to be heated in said cup, and an air tube terminating in said chamber and surrounding said ejector tube, for isolating said ejector tube from the liquid in the reservoir.

5. The combination of a reservoir, having at its bottom a heating chamber separated from the liquid in the reservoir by an air space, and means for permitting the passage of liquid from the reservoir into said cup, of an ejector tube terminating in said cup below the level of liquid therein, and an air tube surrounding said ejector tube and for isolating the ejector tube from the liquid in the reservoir.

6. The combination, with a reservoir, having at its bottom a primary heating chamber, and a heat-exposed member contacting with the bottom thereof, of a secondary heating chamber formed in said member and having a spout, and an ejector tube projecting into said primary chamber and having its lower terminus adjacent the upper end of said spout, said spout having an outlet opening which is smaller than the diameter of the liquid column in the tube.

7. The combination, with a reservoir, a pump disposed in said reservoir and comprising an ejector tube having a shoulder, a removable percolator cup carried by said reservoir, and having projections for engaging the rim of said reservoir, of a blade spring having an aperture to permit the passage of said tube, and resting on said shoulder, and resting with its opposite free ends against the under side of said percolator cup, whereby both, said cup and pump, will be held in position in the reservoir.

JULIAN R. HOLLEY.

Witnesses:
   Chas. F. Schmelz,
   Calista V. B. Holley.